United States Patent [19]

Ewen et al.

[11] Patent Number: 5,173,227
[45] Date of Patent: Dec. 22, 1992

[54] IN-SITU MOLDING OF FIBER REINFORCED COMPOSITES TO NET SHAPE

[75] Inventors: James H. Ewen, Orange; Nestor J. Diaz, Seymour; Robert L. Faiz, Sandy Hook; David J. Parker, Newtown, all of Conn.

[73] Assignee: United Technologies Corporation, Hartford, Conn.

[21] Appl. No.: 623,822

[22] Filed: Dec. 6, 1990

[51] Int. Cl.$^5$ .............................................. B29C 67/22
[52] U.S. Cl. .................................. 264/46.6; 264/46.4; 264/257; 264/258
[58] Field of Search ..................... 264/46.5, 46.6, 46.7, 264/257, 258, 261, 46.4

[56] References Cited

U.S. PATENT DOCUMENTS

| | | | |
|---|---|---|---|
| Re. 27,593 | 3/1973 | Gondeck et al. | 156/79 |
| 4,130,614 | 12/1978 | Saidla | 264/46.5 |
| 4,379,103 | 4/1983 | Doerfling | 264/46.6 |
| 4,471,020 | 9/1984 | McCarthy | 264/46.6 |
| 4,509,358 | 4/1985 | Krowl | 264/258 |
| 4,560,523 | 12/1985 | Plumley et al. | 264/250 |
| 4,618,532 | 10/1986 | Volland et al. | 428/309.9 |
| 4,714,575 | 12/1987 | Preston | 264/46.5 |
| 4,891,176 | 1/1990 | Drysdale et al. | 264/261 |
| 4,988,469 | 1/1991 | Reavely et al. | 264/258 |
| 5,007,976 | 4/1991 | Satterfield et al. | 264/258 |

Primary Examiner—Allan R. Kuhns
Attorney, Agent, or Firm—Terrance J. Radke

[57] ABSTRACT

A method for fabricating composite structures wherein a single mold is used to preform a foam core between fiber reinforcement plies that are subsequently subjected to resin transfer molding to form an integrated foam core composite structure having the formed foam core mechanically interlocked to the composite skins. Fiber reinforcement plies are layed up on contoured molding surfaces of dies to define a core cavity with the mold closed. Foam is injected into the core cavity, concomitantly penetrating the fiber reinforcement plies, and allowed to cure to form the foam core. Heat and pressure generated during foam cure compresses the fiber reinforcement plies to provide debulking therefor. A resin binder is injected into the mold plenum to impregnate the layed-up fiber reinforcement plies, and the formed foam core/resin-impregnated layed-up fiber reinforcement plies are subsequently cured to form the integrated foam core composite structure. Film barriers may be formed in the fiber reinforcement plies to limit penetration of the injected foam to a predetermined number of fiber reinforcement plies. The film barriers may be melted and fused with the injected resin to provide an adhesive bond between the formed foam core and the composite skins, in addition to the mechanical interlock therebetween, to provide an integrated foam core composite structure with superior integrity.

6 Claims, 1 Drawing Sheet

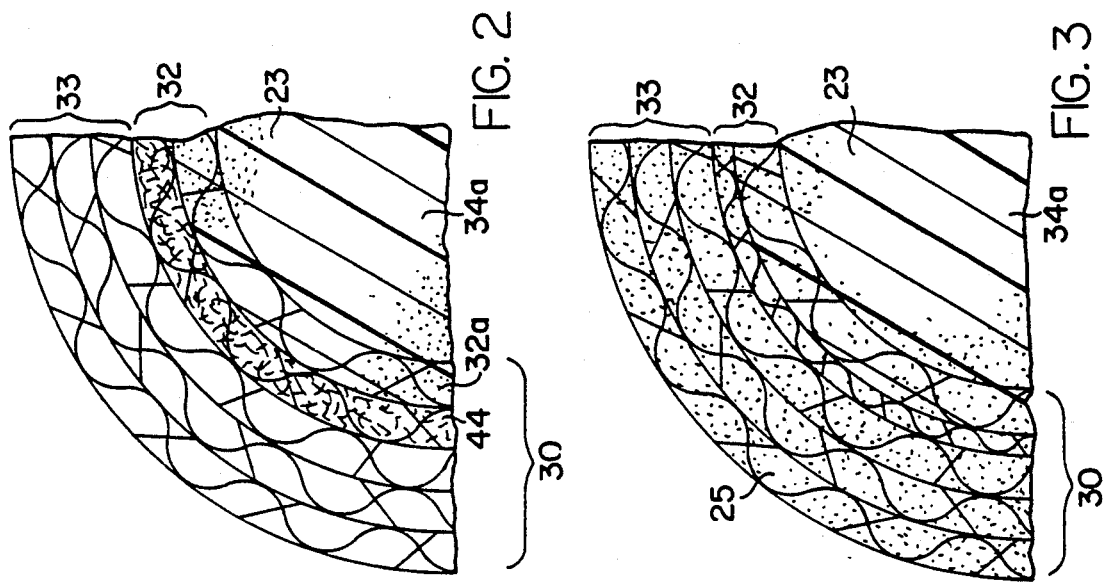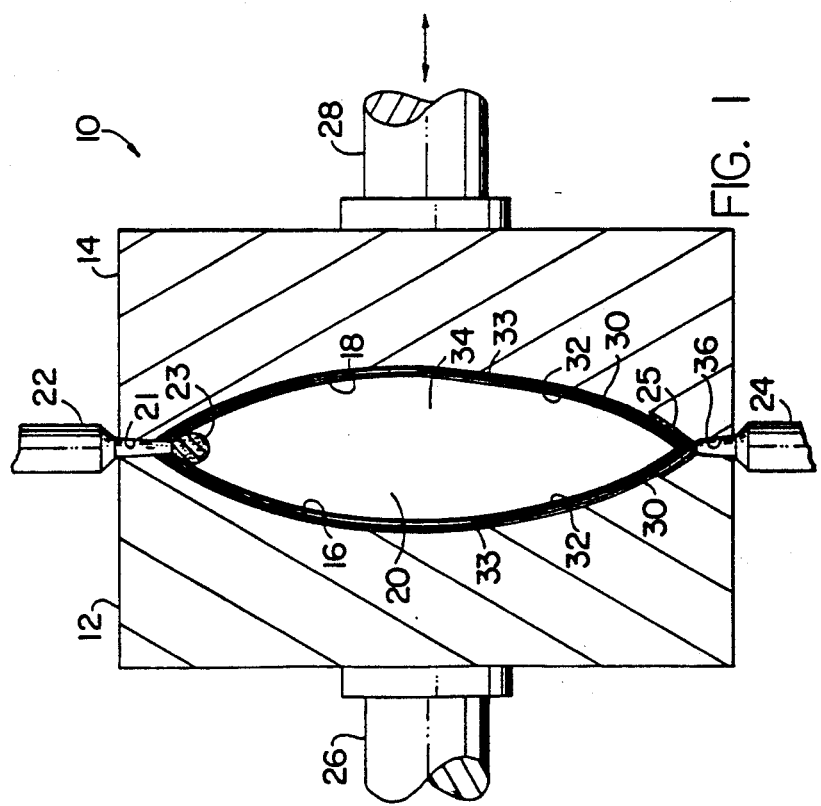

IN-SITU MOLDING OF FIBER REINFORCED COMPOSITES TO NET SHAPE

DESCRIPTION

1. Technical Field

This invention relates to a method for molding composite structures having foam cores and composite skins, and more particularly, to an in-situ molding method using a single mold to form foam cores and fiber reinforcement plies into an integrated foam core composite structure.

2. Background Art

For aerospace applications preformed foam cores are often used as space fillers between composite skins to reduce the weight, while maintaining the load bearing strength, of composite sandwich structures. Many composite sandwich structures such as tail fins and wing tips, however, have complex configurations that make it difficult to fabricate preformed foam cores therefor.

Foam cores may be formed by injection molding or machining. Foam material such as Rohacell foam is machined to form the final configuration of the foam core. Such machining results in excessive labor and material costs, especially for foam cores having complex configurations. Fabrication of preformed foam cores by injection molding requires a complex core mold and several fabrication steps, such as foam injection, curing, post-curing and demolding, before the foam core is formed in a usable configuration.

Preformed foam cores are used in prepreg, resin transfer molding, and other composite manufacturing processes to form composite sandwich structures. In either process, an adhesive material is applied to the surface of the preformed foam core and co-cured with the prepreg or injected fabric to form a bond between the preformed foam core and the fiber reinforcement. The resin transfer molding (RTM) process, in addition, includes additional steps of stabilizing and debulking the fiber reinforcement and laying up the fiber reinforcement on both the preformed foam core and the RTM mold surfaces. These steps add to production costs and limit productivity.

Prior art methods of fabricating foam core composite structures are exemplarily illustrated in U.S. Pat. No. 4,891,176 and Re. 27,593. The '176 patent describes a multi-step process wherein the urethane core and fiber mats are preformed to final configuration and assembled to form a premolded assembly. The premolded assembly is placed in an RTM mold and injected with settable resin to form the final structure. The '593 patent describes a multi-step process wherein fabric/fiber mats are shaped and cured to provide preformed structural facings. The preformed facings are spaced apart and supported in a jig and plastic material injected therebetween and allowed to set to form the laminated structure.

While the foregoing methods provide a means of fabricating and using preformed foam cores to form foam core composite structures, these methods are generally unsatisfactory for fabricating foam core composite structures having complex configurations. A need exists for a relatively simple, economic, efficient method for fabricating foam core composite structures, especially foam core composite structures having complex configurations.

SUMMARY OF THE INVENTION

The present invention provides a method for fabricating integral foam core composite structures, the method having particular utility in fabricating foam core composite structures having complex configurations. The described method eliminates the need for a separate molding or machining operation to preform the foam core, provides debulking of fiber reinforcements during the fabrication process, allows foam core composite structures to be fabricated in a single molding step, and permits net shape forming of the foam core composite structure to final configuration. The described method is relatively inexpensive, eliminates multiple handling of the molding material, and provides increased productivity in fabricating foam core composite structures, especially in the fabrication of composite sandwich structures having complex configurations.

The first step of one embodiment of the method of the present invention comprises laying up of plies of dry fiber reinforcements onto the contoured molding surfaces of a resin transfer mold. Lay up is accomplished in such manner that the fiber reinforcement plies layed up on respective contoured surfaces define a core cavity therebetween when the mold is closed.

A thermoset foam is then injected into the closed mold to fill the core cavity and penetrate the fiber reinforcement plies. The injected foam generates heat and pressure within the mold cavity during curing, the pressure compressing the layed up fiber reinforcement plies into conformance with the contoured surfaces of the mold such that the fiber reinforcements are debulked concurrently with foam core formation.

The injected foam is allowed to cure, typically for a period of 5 to 10 minutes, to produce a formed foam core that is mechanically interlocked to the fiber reinforcement plies. An RTM resin is then injected into the plenum of the mold cavity between the plies of fiber reinforcements and the contoured surfaces of the mold so as to saturate the fiber reinforcement plies.

The RTM mold is then exposed to heat/pressure for a period sufficient to cure the resin saturated fiber reinforcement plies to form composite skins. The heat/pressure simultaneously effects a post cure of the formed foam core. The foregoing described method employs a single mold, in a single molding step, to produce a composite sandwich structure comprising a formed foam core mechanically locked to the composite skins.

During the foam injection step described above, the foam penetrates the fiber reinforcement plies to form a mechanical lock between the innermost ply and the foam core. Foam penetration may be controlled during the fabrication process to maximize the structural loading strength of the composite sandwich structure.

To control foam penetration, an alternative method according to the present invention includes a step wherein some of the fiber reinforcement plies are chemically treated prior to foam injection to form film barriers. The film barriers are operative to limit foam penetration into the fiber reinforcement plies, preferably to a single untreated fiber reinforcement ply, that provides a mechanical interlock between the foam core and the composite skins.

The film barriers may be further operative to melt as a result of the heat/pressure generated during curing of the foam. Preferably, melting of the film barriers occurs subsequent to foam cure such that the film barriers fuse with the subsequently injected RTM resin. The melted film barrier provides adhesion between the foam core and the composite skins.

The foregoing and other features and advantages of the present invention will become more apparent from the following description and accompanying drawings.

BRIEF DESCRIPTION OF THE DRAWINGS

FIG. 1 is a cross-sectional view illustrating an exemplary apparatus for the method of the present invention.

FIG. 2 is a partial cross-sectional view illustrating the interfaces between the formed foam core, barrier film and fiber reinforcement plies prior to resin transfer molding.

FIG. 3 is a partial cross-section view illustrating the embodiment of FIG. 2 after resin transfer molding.

DETAILED DESCRIPTION OF PREFERRED EMBODIMENTS

Referring now to the drawings, FIG. 1 illustrates an exemplary resin transfer mold 10 that is used to fabricate a foam core composite structure according to the method of the present invention. The mold 10 is comprised of movable dies 12, 14 having contoured molding surfaces 16, 18, respectively, that define a mold cavity 20 having the shape of the foam core composite structure to be fabricated. The mold 10 further includes a first injection means 22 for injecting foam 23 into the mold and a second injection means 24 for injecting an RTM resin 25 into the mold. The structure and functioning of such injection means are known to those skilled in the art and need not be described in further detail. The movable dies 12, 14 include means 26, 28 such as cylinders for opening and closing the mold 10.

To form a foam core composite structure according to the method of the present invention, the dies 12, 14 are moved apart from one another and dry fiber reinforcement plies 30 are layed up in the contoured molding surfaces 16, 18 to roughly conform thereto. Alternatively, the fiber reinforcement plies 30 may be preformed prior to lay up in the contoured molding surfaces 16, 18. The outermost layers of the layed-up fiber reinforcement plies 30 within the mold cavity 20 are defined as exposed layers 32 while the remaining layers, i.e., those between the exposed layers 32 and the molding surfaces 16, 18, are defined as internal layers 33.

The fiber reinforcement plies 30 may be in the form of dry fibers, woven cloth, braided cloth, knit cloth, mat, stitched layers of material, tow, yarn, tape, or the like. The reinforcement material may be glass fiber, carbon, graphite, boron, aramids such as Kevlar ™ (E.I. du Pont de Nemours), and the like.

With the mold 10 closed, the exposed layers 32 of the layed up fiber reinforcement plies 30 define a core cavity 34. A thermoset polyurethane foam 23 such as Stepan BX445 (Northfield, Ill.) or Dow Experimental Foam XU-18006 (Midland, Mich.) is injected into the core cavity 34 through a port 21 connected to the first injection means 22. The injected foam 23 fills the core cavity 34 and penetrates into the exposed layers 32.

The injected foam 23 reacts to generate heat and pressure that compresses the layed-up fiber reinforced plies 30 into conformance with the respective contoured molding surfaces 16, 18 of the dies 12, 14. The compressive forces generated by the injected foam 23 debulk the fiber reinforcement plies 30 concurrently with the formation of the foam core.

The injected foam 23 is allowed to cure, typically for a period of about five to ten minutes, to produce a formed foam core 34a. Due to the penetration of the injected foam 23 into the interstices of the exposed layers 32, the cured foam core 34a is mechanically interlocked to the layed-up fiber reinforcement plies 30.

Without opening the mold 10, an RTM resin 25 is injected into the plenum of the mold cavity 20 between the contoured molding surfaces 16, 18 and the internal layers 33 of the layed up fiber reinforced plies 30 by means of port 36 of the second injection means 24. The RTM resin 25 may be an epoxy, epoxy novolac, or other thermosetting resins such as polyesters, polyimides, phenolic resins, and bismaleimides. An exemplary RTM resin 25 is Tactic 123 ™, a Bisphenol A based epoxy resin binder available from Dow Chemical (Midland, Mich.). A sufficient quantity of RTM resin 25 is injected under sufficient pressure to thoroughly impregnate the layed-up fiber reinforcement plies 30. A sufficient pressure for a typical RTM process is about forty to seventy psi.

The mold 10 is then placed in an oven (not shown) to simultaneously effect curing of the resin-saturated fiber reinforcement plies 30 (to form the composite skins) and to post cure the formed foam core 34a. Exemplary curing conditions may include an oven temperature of about 350° F. and a curing period of about two hours. At the end of the cure cycle the foam core composite structure is demolded. Subsequent operations, such as trimming, are accomplished as necessary.

The method of the present invention utilizes the RTM mold to form the foam core between layed-up fiber reinforcement plies, thereby eliminating the need to form the foam core in a separate procedure. The method of the present invention causes the foam core to be mechanically interlocked with the fiber reinforcement plies (the composite skins after resin transfer molding) to provide an integrated foam core composite structure.

While the aforedescribed method provides an integrated foam core composite structure having a good mechanical interlock between the formed foam core and the composite skins, the structural strength of the foam core composite structure may not be sufficient for some applications. Uncontrolled foam penetration into the fiber reinforcement plies reduces the ability of the RTM resin to completely impregnate the fiber reinforcement plies such that the structural strength of the composite skins is reduced.

During the foam injection step described above, the injected foam 23 penetrates the exposed layers 32 of the fiber reinforcement plies 30 to form the mechanical lock between the exposed layers 32 and the foam core 34a. Foam penetration may be controlled during the fabrication process to maximize the structural strength of the foam core composite structure while still providing a mechanical lock between the foam core and the composite skins.

To control foam penetration, an alternative method according to the present invention includes a step wherein film barriers 44 (see FIGS. 2, 3) are incorporated in the exposed layers 32 of the fiber reinforcement plies 30 to limit foam penetration to a predetermined number of plies of the exposed layers 32. The inner layers 33 of the fiber reinforcement plies 30 are not penetrated by the injected foam 23 due to the film barriers 44, thus leaving these layers free for impregnation by the RTM resin 25.

Fiber reinforcement plies are chemically treated with a material that is substantially insoluble to the injected foam and soluble to the RTM resin to create the film barriers 44. The material should also have a melting point such that the heat generated during foam cure is sufficient to melt the film barrier 44, preferably subsequent to foam cure. Suitable materials include thermoplastic polyurethanes and materials such as M-1113 (available from BSAF Structural Materials [Narmco Materials], Anaheim, Calif.), E-905:1, and E-905-L (available from BP Chemicals, Advanced Materials Div., Santa Ana, Calif.).

To form the fiber reinforcement plies 30 in the mold 10, untreated fiber reinforcement plies are first layed up on the contoured surfaces 16, 18 to form the inner layers 33. Chemically treated fiber reinforcement plies are then layed up on the inner layers 33 to form the film barriers 44. A predetermined number of untreated fiber reinforcement plies may then be layed up on the film barriers 44 to form the exposed layers 32. Depending upon the particular application, the number of untreated fiber reinforcement plies comprising the exposed layers 32 may vary between zero and several plies. In one preferred embodiment, the exposed layers 32 comprise a single ply of untreated fiber reinforcement layed up on the film barrier 44, as exemplarily illustrated in FIGS. 2, 3.

During formation of the foam core, the injected foam will penetrate the untreated fiber reinforcement plies comprising the exposed layers 32. The film barriers 44 provide a seal that prevents penetration of the injected foam into the inner layers 33. The film barriers 44 melt as a result of the heat/pressure generated during foam cure to provide an adhesive bond between the foam core 34a and the fiber reinforcement plies 30. Preferably, melting of the film barrier 44 occurs subsequent to foam cure such that the film barrier 44 fuses with the subsequently injected RTM resin 25.

The in-situ molding process described in the previous paragraphs provides a foam core composite structure wherein the foam core is an integral part of the composite structure. The fused film barrier provides an adhesive bond between the formed foam core and the composite skins. A mechanical interlock is provided between the formed foam core and the composite skins due to foam penetration of the untreated ply(s) of the exposed layers 32.

FIGS. 2 and 3 depict an exemplary embodiment illustrating the relationship between the formed foam core 34a, the exposed layers 32, the inner layers 33 and the film barrier 44 before and after resin transfer molding, respectively. With reference to FIG. 2, the exposed layer 32 comprises the film barrier 44 and a single untreated fiber reinforcement ply 32a and the inner layers 33 comprise three untreated fiber reinforcement plies. Material forming the foam core 34a penetrates into the single untreated fiber reinforcement ply 32a to provide a mechanical interlock between the foam core 34a and the fiber reinforcement plies 30. After resin transfer molding is complete, the film barrier 44 has melted and fused into the RTM resin which has impregnated the inner layers 33. Since the film barrier 44 may be soluble to the RTM resin, some penetration of the single fiber reinforcement ply 32a and the foam core 34a by the RTM resin may occur. The melted film barrier provides an adhesive bond between the inner layers 33, the exposed layers 32, and the formed foam core 34a.

Although the present invention has been illustrated and described with respect to certain embodiments, it is to be understood that the present invention is not limited other than by the scope of the claims appended hereto.

What is claimed is:

1. A method for fabricating an integrated foam core composite structure, using a molding apparatus that includes a set of dies having contoured molding surfaces defining a mold cavity having the shape of said integrated foam core composite structure to be fabricated, means for injecting foam, and means for injecting a resin binder, comprising:

laying up a plurality of unpreformed fiber reinforcement plies in the contoured molding surfaces of the set of dies;

closing the set of dies wherein exposed layers of said layed-up plurality of unpreformed fiber reinforcement plies define a core cavity;

injecting a foam material into said core cavity, said injected foam material penetrating said exposed layers of said layed-up plurality of unpreformed fiber reinforcement plies;

allowing said injected foam material to cure to form a foam core mechanically interlocked to said layed-up plurality of unpreformed fiber reinforcement plies, curing of said injected foam generating heat and pressure that simultaneously compresses said layed-up plurality of unpreformed fiber reinforcement plies into conformance with the contoured molding surfaces such that said layed-up plurality of unpreformed fiber reinforcement plies are debulked;

injecting the resin binder into a plenum of the mold cavity to impregnate said layed-up plurality of debulked fiber reinforcement plies; and curing said resin binder-impregnated layed-up plurality of debulked fiber reinforcement plies to form composite skins, and wherein said formed foam core is simultaneously post cured;

said formed foam core and said composite skins in combination defining said integrated foam core composite structure having said formed foam core mechanically interlocked with said composite skins.

2. The method of claim 1 further comprising:

forming film barriers in said layed-up plurality of unpreformed fiber reinforcement plies to limit penetration of said injected foam to a predetermined number of unpreformed fiber reinforcement plies forming said exposed layers, said film barriers being operative to melt as a result of the heat and pressure generated by curing of said injected foam.

3. The method of claim 2 wherein said film barriers are formed by chemically treating unpreformed fiber reinforcement plies with a material that renders said treated unpreformed fiber reinforcement plies substantially insoluble to said injected foam and substantially soluble to the injected resin binder thereby permitting penetration of the treated unpreformed fiber reinforcement plies by the resin binder.

4. A method for fabricating an integrated foam core composite structure, using a molding apparatus that includes a set of dies having contoured molding surfaces defining a mold cavity having the shape of said integrated foam core composite structure to be fabricated, means for injecting foam, and means for injecting a resin binder, comprising:

laying up a plurality of fiber reinforcement plies in the contoured molding surfaces of the set of dies;

forming film barriers in said layed-up plurality of fiber reinforcement plies by chemically treating fiber reinforcement plies;

said laying up step including the steps of laying up a first plurality of untreated fiber reinforcement plies in the contoured molding surfaces of the set of dies, laying up said treated fiber reinforcement plies forming said film barriers onto said first plurality of untreated fiber reinforcement plies, and laying up a predetermined number of untreated fiber reinforcement plies onto said treated fiber reinforcement plies, said first plurality of untreated fiber reinforcement plies, said treated fiber reinforcement plies and said predetermined number of untreated fiber reinforcement plies defining said layed up plurality of fiber reinforcement plies;

closing the set of dies wherein exposed layers of said layed-up predetermined number of untreated fiber reinforcement plies define a core cavity;

injecting a foam material into said core cavity, penetration of said injected foam being limited to said predetermined number of untreated fiber reinforcement plies;

allowing said injected foam material to cure to form a foam core mechanically interlocked to said layed-up plurality of fiber reinforcement plies, curing of said injected foam generating heat and pressure that simultaneously compresses said layed-up plurality of fiber reinforcement plies into conformance with the contoured molding surfaces such that said layed-up plurality of fiber reinforcement plies are debulked;

injecting the resin binder into a plenum of the mold cavity to impregnate said layed-up plurality of fiber reinforcement plies; and curing said resin binder-impregnated layed-up plurality of fiber reinforcement plies to form composite skins, and wherein said formed foam core is simultaneously post cured;

said treated fiber reinforcement plies being substantially insoluble to said injected foam and substantially soluble to the injected resin binder;

said formed foam core and said composite skins in combination defining said integrated foam core composite structure having said formed foam core mechanically interlocked with said composite skins.

5. The method of claim 4 wherein said predetermined number of untreated fiber reinforcement plies comprises one untreated fiber reinforcement ply.

6. The method of claim 4 further comprising the step of melting said treated fiber reinforcement plies by the heat generated by curing of said injected foam to form an adhesive bond between the formed foam core and said layed-up fiber reinforcement plies forming said composite skins.

* * * * *